US011138683B2

(12) United States Patent
Sung et al.

(10) Patent No.: US 11,138,683 B2
(45) Date of Patent: Oct. 5, 2021

(54) CONSULTATION SERVICE APPARATUS OF AN AUTOMATIC CIVIL SERVICE SYSTEM AND INFORMATION PROCESSING METHOD

(71) Applicant: AVISION INC., Hsinchu (TW)

(72) Inventors: Chieh-Yi Sung, Hsinchu (TW); Vamsi Krishna Neelam, Hsinchu (TW)

(73) Assignee: AVISION INC., Hsinchu (TW)

( * ) Notice: Subject to any disclaimer, the term of this patent is extended or adjusted under 35 U.S.C. 154(b) by 374 days.

(21) Appl. No.: 16/356,396

(22) Filed: Mar. 18, 2019

(65) Prior Publication Data

US 2020/0065926 A1 Feb. 27, 2020

(30) Foreign Application Priority Data

Aug. 27, 2018 (TW) .................................. 107129844

(51) Int. Cl.
  *G06Q 50/26* (2012.01)
  *G06K 9/00* (2006.01)
  (Continued)

(52) U.S. Cl.
  CPC ......... *G06Q 50/26* (2013.01); *G06K 9/00442* (2013.01); *G06Q 20/18* (2013.01);
  (Continued)

(58) Field of Classification Search
  CPC ...... G06Q 20/26; G06Q 20/18; G06Q 20/209; G06Q 50/26; G06K 9/00442; H04N 1/387
  See application file for complete search history.

(56) References Cited

U.S. PATENT DOCUMENTS

2005/0055475 A1\* 3/2005 MacKay ............ H04N 1/00204
  710/15
2012/0221361 A1\* 8/2012 Park ...................... G06Q 40/08
  705/4
(Continued)

FOREIGN PATENT DOCUMENTS

CN 105913358 A 8/2016
CN 105913582 A 8/2016
(Continued)

OTHER PUBLICATIONS http://busanfun.com/2015-07-17-316/.

*Primary Examiner* — Laura A Gudorf
(74) *Attorney, Agent, or Firm* — Schmeiser, Olsen & Watts, LLP

(57) ABSTRACT

Provided are a consultation service apparatus of an automatic civic service system and an information processing method. A user holds an application document and identity credentials and operates a consultation service apparatus at a public area. The consultation service apparatus is connected to at least one business/institutional organization at a remote end through a network. The consultation service apparatus acquires image information of the application document and the identity credentials through an image scanner, confirms validity of the image information and performs service classification thereon, transmits the image information to a corresponding organization according to a classification result, and generates a certificate of completion for proof of completion of all procedures. By virtue of the automatic application submission mechanism, social cost can be reduced and working efficiency can be enhanced.

19 Claims, 7 Drawing Sheets

(51) Int. Cl.
    *G06Q 20/18*    (2012.01)
    *G06Q 20/20*    (2012.01)
    *H04N 1/387*    (2006.01)
(52) U.S. Cl.
    CPC ........... *G06Q 20/209* (2013.01); *H04N 1/387* (2013.01); *G06K 2209/01* (2013.01); *G06K 2209/504* (2013.01); *H04N 2201/0094* (2013.01)

(56) References Cited

U.S. PATENT DOCUMENTS

| | | | |
|---|---|---|---|
| 2013/0021652 A1* | 1/2013 | Yoon | H04N 1/387 358/452 |
| 2013/0036017 A1 | 2/2013 | Galloway | |
| 2014/0118466 A1* | 5/2014 | Chang | G06Q 40/02 348/14.04 |

FOREIGN PATENT DOCUMENTS

| | | |
|---|---|---|
| CN | 205451271 U | 8/2016 |
| CN | 106127587 A | 11/2016 |
| CN | 108197890 A | 6/2018 |
| CN | 108335086 A | 7/2018 |
| TW | 200943214 A | 10/2009 |
| TW | M418355 U | 12/2011 |
| TW | M418355 U | 12/2011 |
| TW | I357026 B | 1/2012 |

* cited by examiner

CONSULTATION SERVICE APPARATUS OF AN AUTOMATIC CIVIL SERVICE SYSTEM AND INFORMATION PROCESSING METHOD

BACKGROUND OF THE INVENTION

1. Field of the Invention

The present invention relates to a civil service system installed in a public area for civilians to operate and, more particularly, to a consultation service apparatus of an automatic civil service system and an information processing method for the same.

2. Description of the Related Art

Civilians of developing countries lagging behind in terms of infrastructure and economic condition usually suffer a lot of inconveniences in their daily life, one of which is when they have to apply for services from government agencies or civic organizations as most services must go through service staffs personally for applications to get the applications validated and further distributed. Such red tape causes civilians to wait in a long line for their services at public organizations, such as government agencies, public environments, railroad stations, town and county offices, motor vehicle departments, telecommunications bureaus, public utilities branches, and the like, thus wasting not only time of civilians but resources of government or civic organizations. It also happens that service staffs sometimes ask for fee or commission before applications can be approved or even intentionally delete the applications if the demand is not met, rendering civilians in a helpless situation.

Conventionally, some developed countries provide consultation services kiosks with navigation functions, which purely involve video and audio outputs, in public spaces. Despite understanding of relevant information, civilians still have to bring the paper documents to queue up for service of a designated service staff. It turns out that the foregoing problem still leaves unresolved and it becomes more problematic in developing countries or remote areas.

Although well-established infrastructure and dense population in developed countries bring about ubiquitous convenience stores, one kind of multimedia kiosks is installed in many convenience stores for customer services. However, such type of multimedia kiosks mainly allows customers to do ticket purchase, copy of documents or credentials, payment, deposit of value in cards, redemption of reward points, online shopping, delivery services, and the like. If people intend to apply for services of government agencies or civic organizations, they still have to personally go to the service counters to get the application forms for the desired services, fill out the forms, wait in a line to submit the applications, and finally realize whether the applications get approved after a long wait. As can be seen from those services provided by the multimedia kiosks in convenience stores, the inefficient and time-consuming applications for services of government agencies or civic organizations fail to be resolved by the multimedia kiosks. Besides, convenience stores may not even prevail in many developing countries.

SUMMARY OF THE INVENTION

An objective of the present invention is to provide a consultation service apparatus of an automatic civic service system and an information processing method for the same capable of removing the shortcomings of manually processing applications for services in association with long waiting time for queuing up and resolving the issues of resource waste of business/institutional organization for assurance of reduced social cost and enhanced working efficiency.

To achieve the foregoing objective, a consultation service apparatus is installed at a public space and is connected to a remote end through a network, the information processing method for an automatic civic service system includes steps of:

scanning an application document and identity credentials to generate application image information containing content of the application document and the identity credentials for an application;

determining a type of service to be performed according to validity of the application image information;

when determining that the application image information is validated correctly, performing service classification and transmitting the application image information to a corresponding business or institutional organization of the remote end; and generating a certificate of completion to prove that all procedures for the application are done.

From the foregoing steps, the consultation service apparatus is installed in a public area for users to hold the application document and the identity credentials to submit an application. The consultation service apparatus first scans the application document and the identity credentials of a user to acquire the application image information containing the content of the application document and the identity credentials, confirms the validity of the application image information and then performs service classification, transmits the application image information to a corresponding business/institutional organization at the remote end according to a classification result, and generates a certificate of completion for proof of completion of all procedures of the application. As a result of the automatic application submission mechanism, the issues of long waiting time for queuing up and waste of resources can be eliminated to attain the goal of reduced social cost and increased working efficiency.

To achieve the foregoing objective, the consultation service apparatus of an automatic civil service system includes a display module, an input module, a communication module, an image scanner, a printer, and a processor.

The display module provides a display screen.

The input module is adapted for a user to input.

The communication module is connected to at least one business or institutional organization of a remote end through a communication protocol.

The image scanner scans an application document of an application and identity credentials placed therein by the user to generate application image information containing content of the application document and the identity credentials.

The printer prints with multiple types of papers varying in paper size and paper texture.

The processor is electrically connected to the display module, the input module, the communication module, the image scanner, and the printer.

The processor receives the application image information from the image scanner, performs a recognition analysis procedure to generate an analysis result, performs service classification according to the analysis result and transmits the application image information to the corresponding business or institutional organization through the communication module, and generates a certificate of completion taken as proof for completion of all procedures of the application through the display module and the printer.

In view of the foregoing structure, a user holds the application document and the identity credentials and simultaneously sees a desired service via the display screen, and performs input through the input module. When confirming the application document to be sent, the user places the application document and the identity credentials in the image scanner for the image scanner to generate the application image information containing the content of the application document and the identity credentials. The processor then performs the recognition analysis procedure on the application image information to generate the analysis result taken as the basis of confirming the type of service to be performed, transmits the application image information to the corresponding business/institutional organization via the communication module, and generates the certificate of completion to prove that the user completes all procedures for the service application. Because of the automatic application submission mechanism, the issues of long waiting time for queuing up and waste of resources can be eliminated to attain the goal of reduced social cost and increased working efficiency.

To achieve the foregoing objective, the automatic civic service system includes a cloud server and a consultation service apparatus.

The cloud server is located at a remote end and is associated with at least one business or institutional organization.

The consultation service apparatus is installed in a public space, is connected to the cloud server through a network to exchange information, and has a touch display, an image scanner and a printer.

The touch display provides an operation interface. The image scanner scans an application document of an application and identity credentials to generate application image information containing content of the application document and the identity credentials. The consultation service apparatus transmits the application image information to the cloud server for the cloud server to perform service classification according to validity of the application image information. When the application image information is determined to be valid, the cloud server performs the service classification and transmits the application image information to a corresponding business or institutional organization. When the business or institutional organization receives the application image information, the cloud server transmits a certificate of completion to the consultation service apparatus for proof of completion of all procedures of the application.

Given the foregoing system, the consultation service apparatus is installed in a public area for users to hold the application document and the identity credentials and simultaneously watch the screen of the touch display for operation of submitting an application. When confirming to submit the application, the user places the application document and the identity credentials in the image scanner of the consultation service apparatus to acquire the application image information containing the content of the application document and the identity credentials. The consultation service apparatus transmits the application image information to the cloud server to perform the recognition analysis procedure to generate the analysis result. By doing so, the cloud server can carry out large amount of information computations to increase the information analysis speed. When performing the service classification according to the analysis result, the cloud server directly transmits the application image information to the corresponding business/institutional organization. After the business/institutional organization confirms to receive the application image information, the cloud server informs the consultation service apparatus and transmits the certificate of completion as proof of completion of all procedures of the application. The certificate of completion may be displayed on the touch display or may be printed out by the printer in the form of a piece of paper to the user to keep. By virtue of the automatic civic service system, not only can the mechanism of submitting application information be automated but information computation speed can be enhanced, and the issues of long waiting time for queuing up and waste of resources can be eliminated to attain the goal of reduced social cost and increased working efficiency.

Other objectives, advantages and novel features of the invention will become more apparent from the following detailed description when taken in conjunction with the accompanying drawings.

DETAILED DESCRIPTION OF THE INVENTION

Figure 1:
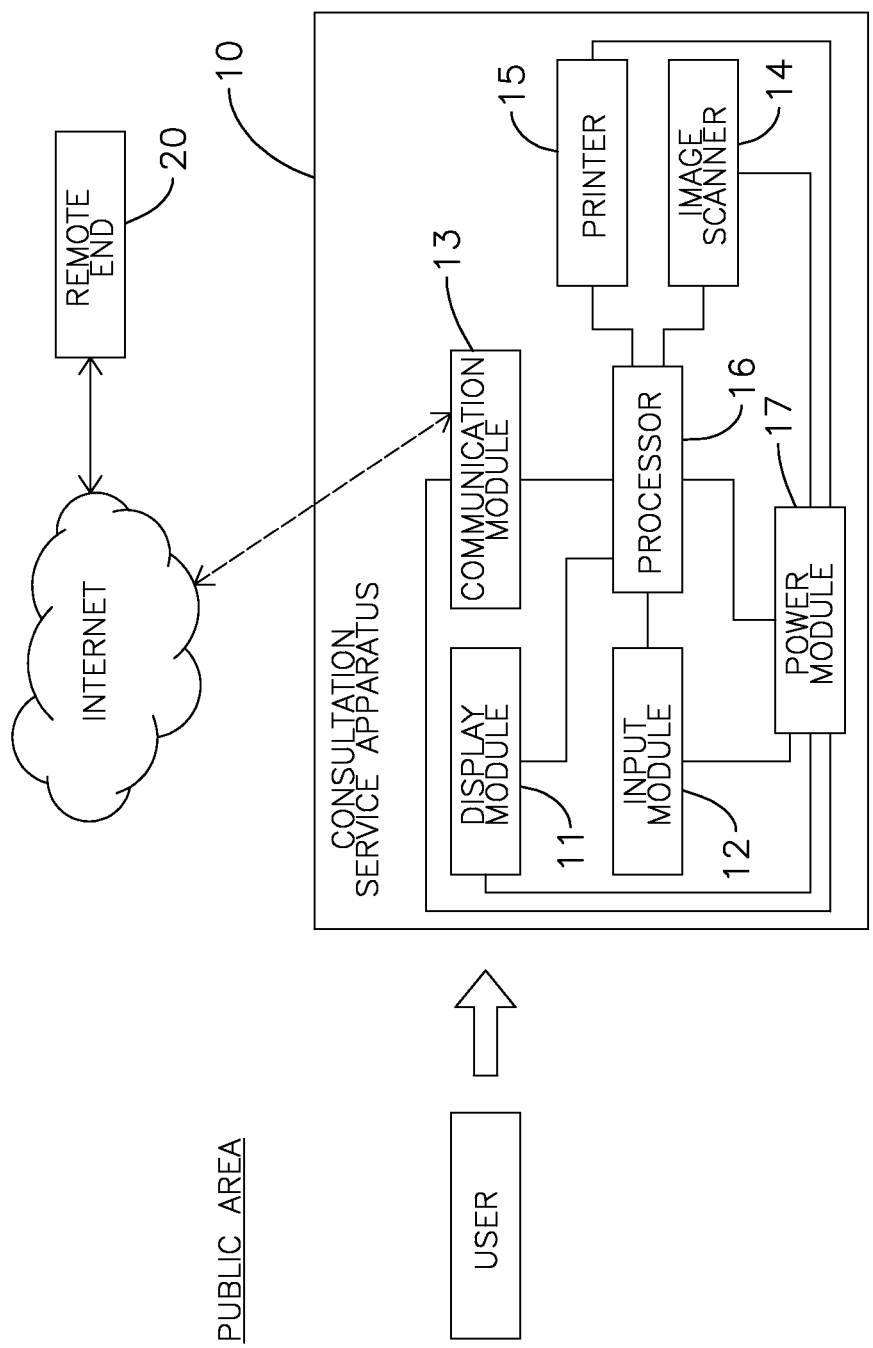
FIG. 1 is a functional block diagram showing system architecture of a first embodiment of an automatic civic service system in accordance with the present invention.

With reference to FIG. 1, a first embodiment of an automatic civic service system in accordance with the present invention includes a consultation service apparatus 10 and a remote end 20. The consultation service apparatus 10 is connected to the remote end 20 through the Internet. The consultation service apparatus 10 includes a display module 11, an input module 12, a communication module 13, an image scanner 14, a printer 15, and a processor 16. In the present embodiment, the consultation service apparatus 10 further includes a power module 17 to supply power for operation of the consultation service apparatus 10. The processor 16 is electrically connected to the display module 11, the input module 12, the communication module 13, the image scanner 14 and the printer 15. The power module 17 is electrically connected to the display module 11, the input module 12, the communication module 13, the image scanner 14, the printer 15 and the processor 16. The remote end 20 includes at least one business/institutional organization.

The display module 11 is provided for users to view a display screen and to perform desired operation, such as inquiry, navigation and application, through the input module 12. In the present embodiment, the display module 11 and the input module 12 are combined as a touch display.

The communication module 13 complies with a communication protocol and is connected to the at least one business/institutional organization of the remote end 20 to exchange information. The communication protocol may be a wireline protocol or a wireless protocol. The image scanner 14 is provided for users to place an application document and identity credentials therein for scanning and generating application image information containing content of the document and the credentials.

The image scanner may be an ADF (Automatic Document Feeder) image scanner which is provided to automatically feed and scan the application document and the identity credentials. The printer 15 serves to print with multiple types of papers varying in paper size and paper texture. The printer 15 may be a monochrome printer or a color printer and may be one of a laser printer, an inkjet printer, an impact printer, a dot matrix printer, and a line printer.

In the present embodiment, a document counter is installed in a public area with all kinds of application documents thereon. A user can acquire the application document from the document counter or use a computer at home or in the office to download the application document through the Internet and print out the document. Alternatively, the user can directly select required application document through the input module 12 of the consultation service apparatus 10 located in the open space for the processor 16 to drive the printer 15 to print out the selected application document.

While holding the application document and the identity credentials, the user can browse an operation guide displayed on the screen of the display module 11 and perform operation through the input module 12. When the user confirms the application document to be submitted, the application document and the identity credentials can be placed in the image scanner 14, and the processor 16 receives the application image information containing the content of the application document and the identify credentials via the image scanner 14 and performs a recognition analysis procedure to generate an analysis result which is taken as the basis of confirming service classification of the application.

Subsequently, the processor 16 performs the service classification according to the analysis result and transmits the application image information to a corresponding business/institutional organization of the remote end, and the display module 11 is collaborated with the printer 15 to generate a certificate of completion taken as proof for completion of all procedures of the application. The certificate of completion can be displayed on the display module 11 or can be printed out in the form of a piece of paper for the user to keep. Furthermore, the display module 11 can be collaborated with the input module 12 to provide the user to finish a payment procedure. After the user is done with the payment procedure, a paper receipt printed out by the printer 15 can be kept by the user. Given the foregoing approach, automatic submission of application documents can be securely completed, and the issues of wasting time and resources consumed during application can be tackled, such that the social cost can be reduced and working efficiency can be enhanced.

Figure 2:
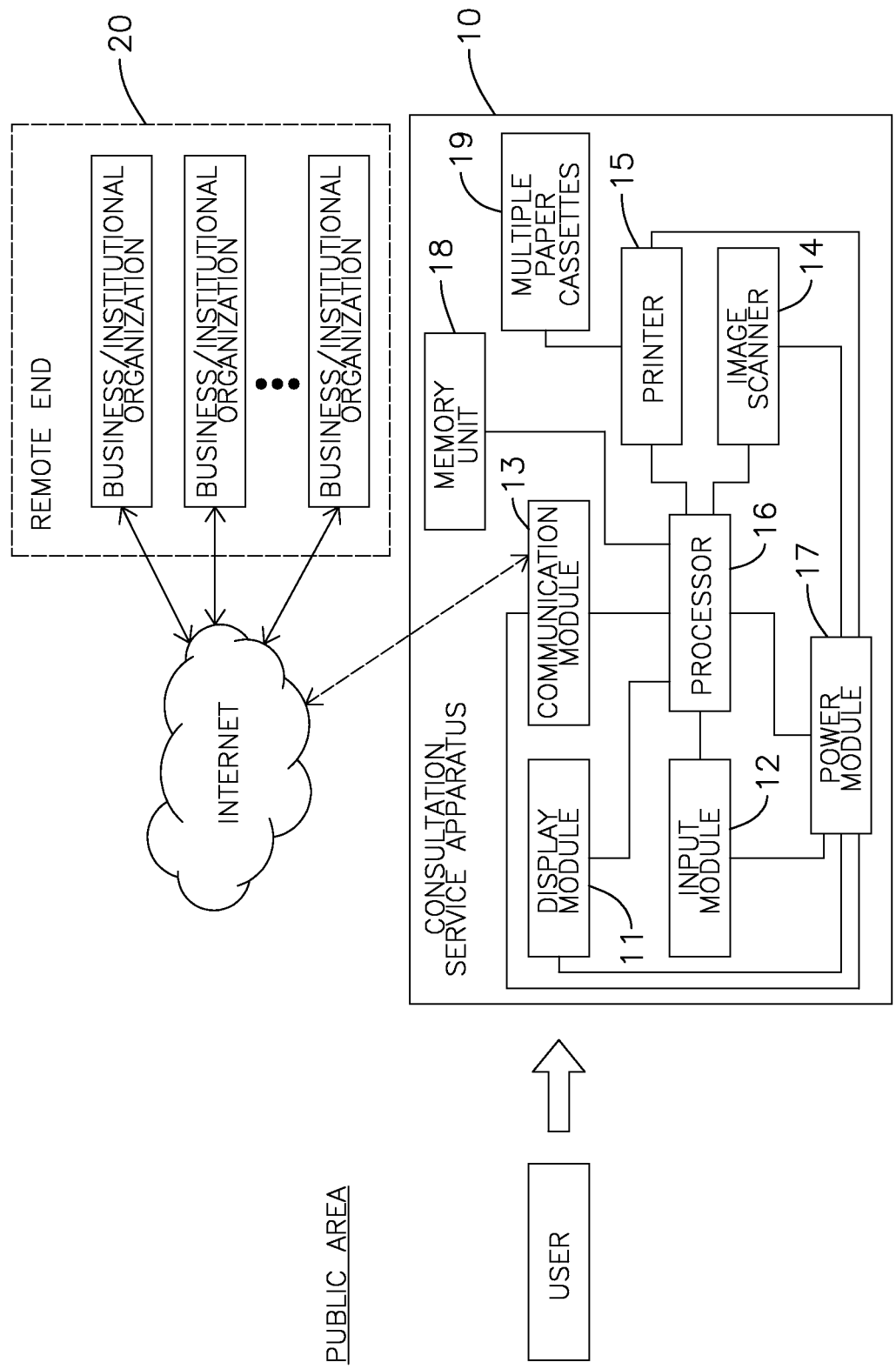
FIG. 2 is a functional block diagram showing system architecture of a second embodiment of an automatic civic service system in accordance with the present invention.

With reference to FIG. 2, a second embodiment of an automatic civic service system in accordance with the present invention differs from the foregoing embodiment in that the remote end 20 includes multiple cloud servers, and the consultation service apparatus 10 further includes a memory unit 18 and multiple paper cassettes 19. Each cloud server is connected to at least one business/institutional organization, and each of the at least one business/institutional organization may be a motor vehicle department, a telecommunications bureau, public utilities branch, or the like. The memory unit 18 is electrically connected to the processor 16. The multiple paper cassettes 19 are connected and paired with the printer 15. The memory unit 18 stores multiple pieces of audio and video information for operation guide and is built in with multiple application documents. The memory unit 18 also stores multiple pieces of application image information scanned by the image scanner 14 and including the content of the application document and the identify credentials for purpose of later verification and backup. The multiple paper cassettes 19 serve to load papers with different sizes and textures. When the printer 15 prints out the user's application document or paper receipt, one of the multiple paper cassettes provides corresponding paper.

In the present embodiment, when the user confirms to submit the application document, the application document and the identity credentials are placed in the image scanner 14 of the consultation service apparatus 10 to acquire the application image information including the content of the application document and the identify credentials, and the consultation service apparatus 10 transmits the application image information to a corresponding cloud server to perform the recognition analysis procedure to generate the analysis result. As large amount of data computation can be performed by the cloud server, an information analysis speed can be increased.

When the cloud server performs service classification according to the analysis result, the application image information can be directly sent to a corresponding business/institutional organization. After the business/institutional organization confirms receipt of the application image information, the cloud server transmits the certificate of completion to the consultation service apparatus 10 to inform the user of the completion of application procedures. The certificate of completion can be displayed on the touch display or is printed out by the printer 15 in the form of a piece of paper for the user to keep as proof for completion of application procedures. Furthermore, when the user also completes the payment procedure through the touch display, the printer 15 then prints out the paper receipt for the user to keep. Accordingly, not only can the mechanism of submitting application documents be automated, information computation speed can be also raised.

Figure 3:
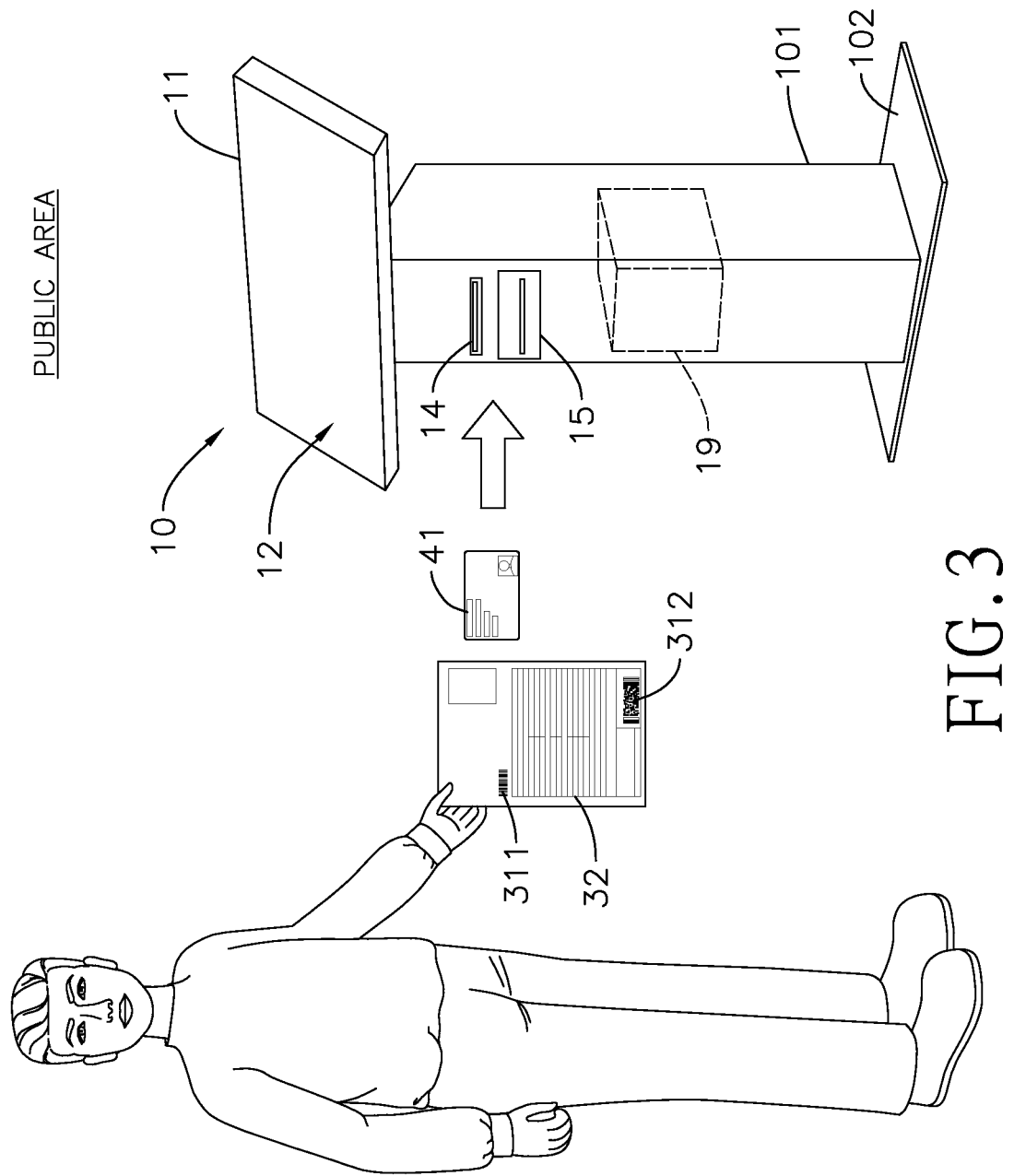
FIG. 3 is a schematic operational diagram of the automatic civic service system in FIG. 1 or 2.

Operation of the foregoing automatic civic service system can be described as follows. With reference to FIG. 3, the consultation service apparatus 10 includes a body 101 and a base 102. The body 101 takes the form of a box. The base 102 takes the form of a plate. The body 101 is mounted on a top surface of the base 102 and has a receiving space defined in the body 101 to receive the communication module 13, the image scanner 14, the printer 15, the processor 16, the power module 17, the memory unit 18 and the paper cassettes 19. The body 101 has two slots formed through a front wall of the body 10 to respectively correspond to a paper entry of the image scanner 14 and a paper exit of the printer 15. A touch display formed by the display module 11 and the input module 12 and mounted on a top of the body 101 is electrically connected to the processor 16 located inside the consultation service apparatus 10. In the present embodiment, the display module 11 is a display screen with a preferred size ranging from 12 inches to 32 inches, and the size of the display module is a 20-inch display screen for providing a comfortable viewing range for users.

The application document has a set of barcodes, a set of fields 32 and relevant textual description. The set of barcodes includes a piece of service type information and has a one-dimensional barcode 311 and/or a two-dimensional barcode 312. The set of fields 32 is provided to allow users to fill in, sign or apply stamp. The relevant textural description assists users to correctly fill out application information. The identity credentials may be an ID (Identification) card, electronic identity card, natural person certificate, or the like, and has a set of identity information fields 41 with the name, date of birth, permanent address, nationality, and the like printed thereon.

In view of the drawbacks of conventional techniques, civilians always have to personally apply for services from government agencies or civic organizations as most services must go through service staffs personally to get the applications validated and further distributed. Such a problem is even more serious in developing countries, and intentional deletion of the applications by the service staffs happens all the time. Hence, installing the foregoing consultation service apparatus 10 at a public space, such as government agencies, public environments, railroad stations, town and county offices, motor vehicle departments, telecommunications bureaus, public utilities branches, and the like, can get rid of the shortcomings generated when manually processing applications and resolve the issues of long waiting time for queuing up and waste of resources, not only reducing the social cost but also increasing the working efficiency.

Figure 4:
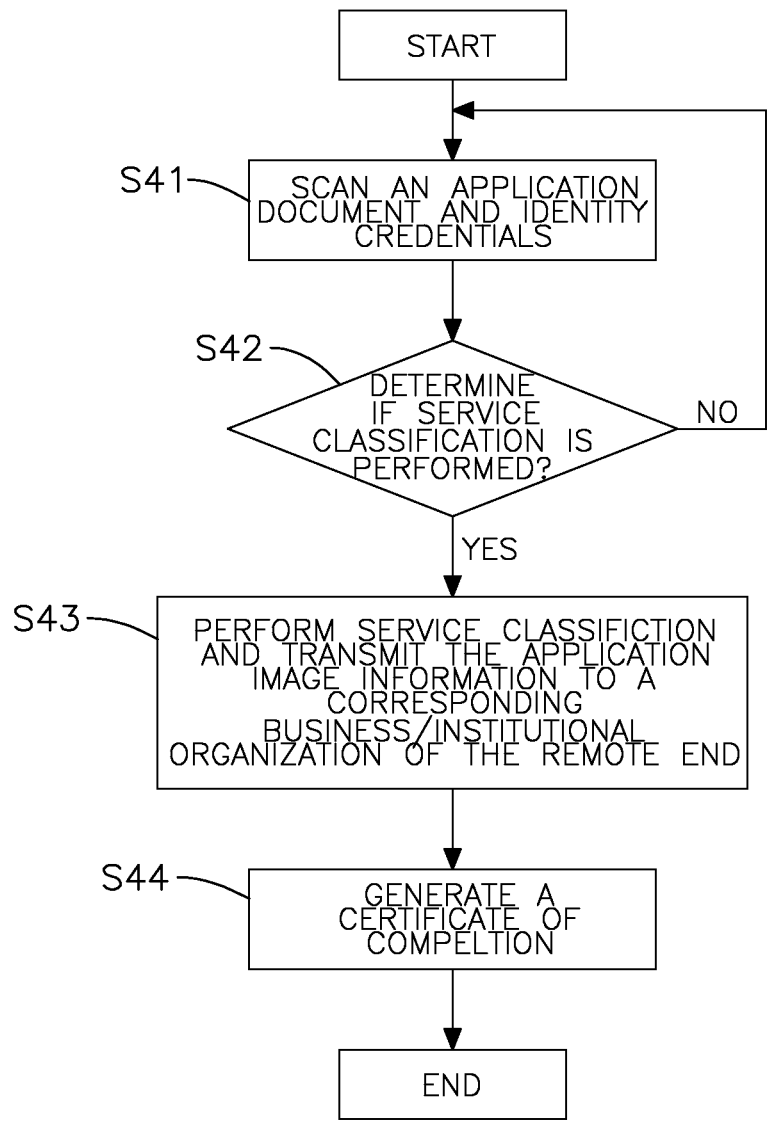
FIG. 4 is a flow diagram of a first embodiment of an information processing method in accordance with the present invention.

According to the foregoing embodiments of the automatic civic service system and practical operation thereof, an information processing method for the automatic civic service system can be further induced. By installing the consultation service apparatus 10 at a public space and connecting the consultation service apparatus 10 with the remote end 20, with reference to FIG. 4, the information processing method is performed by the consultation service apparatus 10 and includes the following steps.

Step S41: Scan an application document and identity credentials to generate application image information containing content of the application document and the identity credentials for an application. After the application image information is generated, the user's information on the application document is compared with corresponding information on the application image information, such as user's signature, to confirm the user's identity. When the user's identity is verified to be correct, the following steps are performed.

Step S42: Determine if service classification is performed according to the validity of the application image information. When the application image information is validated correctly, perform step S43. Otherwise, resume step S41.

Step S43: Perform service classification and transmit the application image information to a corresponding business/institutional organization of the remote end. In the present embodiment, the image data can be temporarily stored in the memory unit 18 of the consultation service apparatus 10. For example, a classification database can be planned in the memory unit 18 for storing the application image information in the classification database according to a result of the service classification.

Step S44: Generate a certificate of completion to prove that all procedures for the application are done.

Figure 5:
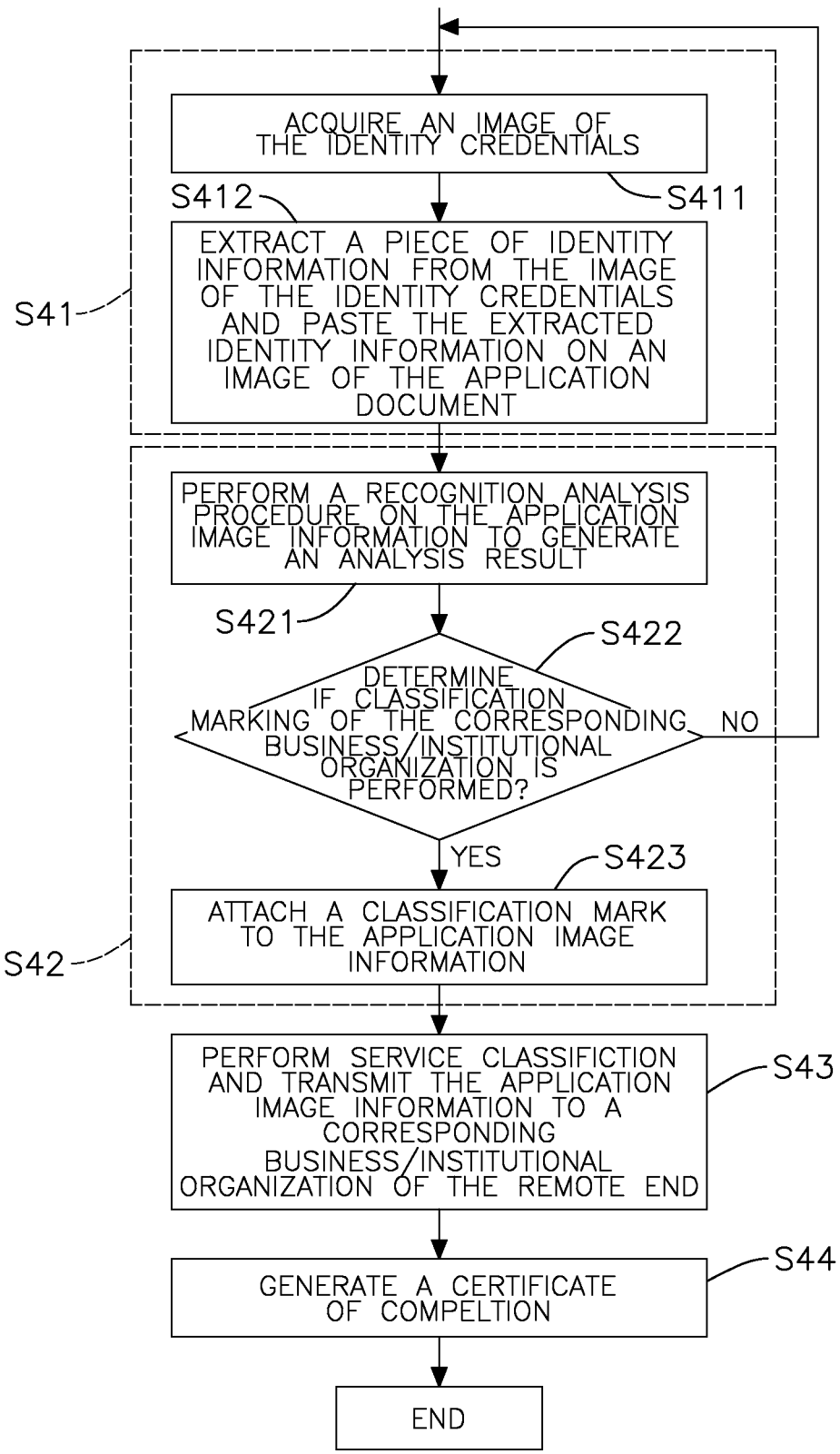
FIG. 5 is another flow diagram of the information processing method in FIG. 4.

Furthermore, with reference to FIG. 5, step S41 includes the following sub-steps.

Step S411: Acquire an image pertinent to the identity credentials in the application image information.

Step S412: Perform an optical character recognition (OCR) algorithm to extract a piece of identity information from the image pertinent to the identity credentials and paste the extracted identity information on a location of an image of the application document in the application image information in association with a corresponding field 32 of the application document.

With further reference to FIG. 5, step S42 further includes the following sub-steps.

Step S421: Perform a recognition analysis procedure on the application image information to generate an analysis result and ascertain the validity of an application form in the application image information and a corresponding business/institutional organization according to the analysis result. In the present embodiment, the recognition analysis procedure includes a barcode recognition algorithm and/or an OCR algorithm and/or a form characteristic recognition algorithm. For example, a barcode recognition algorithm is conducted for recognition of the application image information to initially confirm the validity of the application form and the corresponding business/institutional organization. The OCR algorithm is performed next to confirm if texts in the application form are correct. Then, the form characteristic recognition algorithm is optionally performed to confirm if the application form is a right form for the corresponding business/institutional organization.

Step S422: Determine if classification marking of the corresponding business/institutional organization is performed according to the analysis result. When the determination result is positive, perform step S423. Otherwise, resume step S411.

Step S423: Attach a classification mark to the application image information with the classification mark taken as the proof of transmission to the corresponding business/institutional organization of the remote end 20.

Furthermore, transmit the application image information to a corresponding business/institutional organization of the remote end according to the classification mark.

Figure 6:
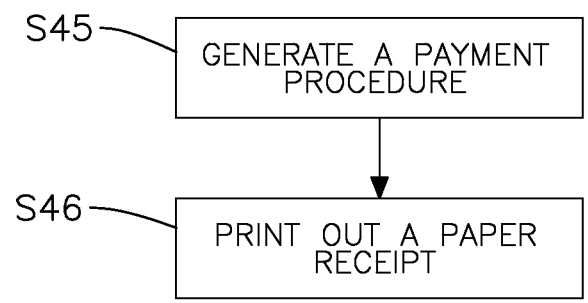
FIG. 6 is a flow diagram of a second embodiment of an information processing method in accordance with the present invention.

After the classified application image information is sent to the corresponding business/institutional organization, the payment procedure can be directly performed through the consultation service apparatus 10 and the consultation service apparatus 10 stores the application image information. Alternatively, after confirming the application image information, the business/institutional organization returns the certificate of completion from the remote end 20 to the consultation service apparatus 10 for proof of completion of all procedures. Accordingly, with reference to FIG. 6, step S44 further includes the following sub-steps.

Step S45: Generate a payment procedure.

Step S46: After the payment procedure is done, print out a paper receipt.

Figure 7:
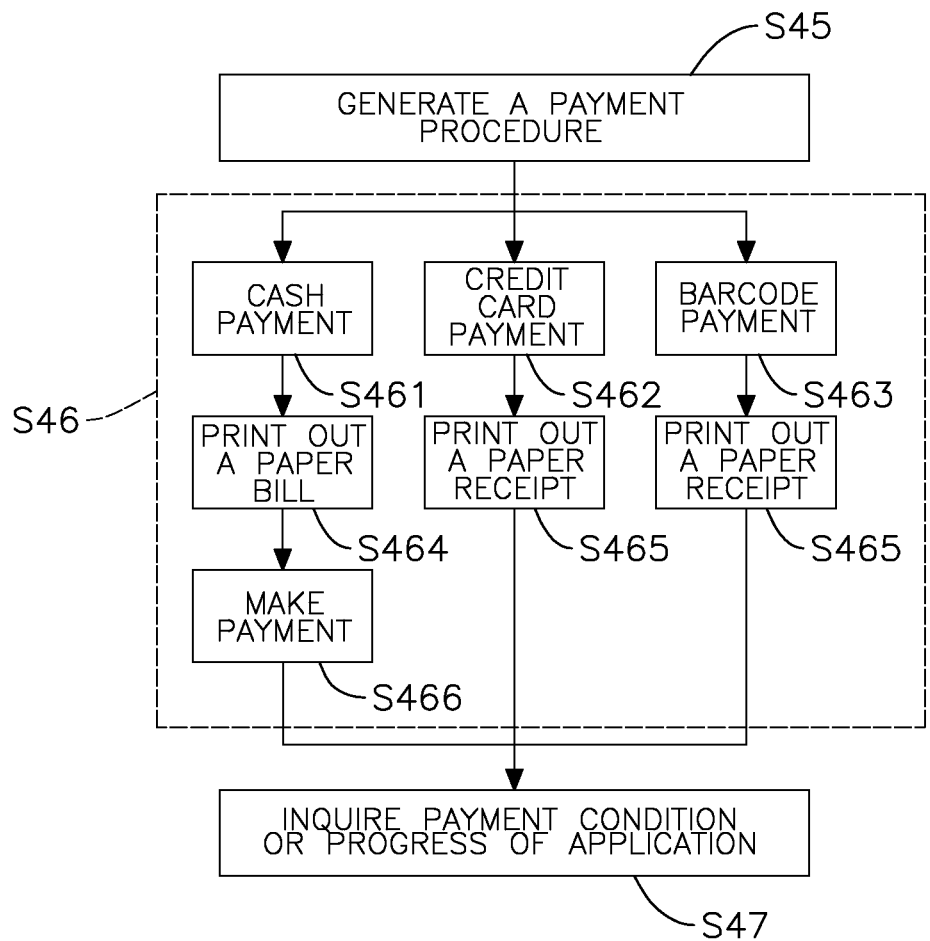
FIG. 7 is a flow diagram of a third embodiment of an information processing method in accordance with the present invention.

Moreover, with reference to FIG. 7, the information processing method in accordance with the present invention further includes the following sub-steps of step S46 and step S47.

Step S461: Provide a cash payment mechanism; step S462: Provide a credit card payment mechanism; step S463: Provide a barcode payment mechanism. The user can choose one of the mechanisms provided by steps S461, S462, S463 for payment. After step S461 is chosen, sequentially perform steps S464, S466 and S47. After step S462 or step S463 is chosen, sequentially perform steps S465 and S47.

Step S464: Print out a paper bill with corresponding payment information thereon.

Step S465: Print out a paper receipt with a timestamp and information for proof of payment.

Step S466: Make payment according to the corresponding payment information of the paper bill.

Step S47: Inquire subsequent payment condition or progress of the application through the corresponding payment information of the paper bill or the timestamp or information for proof of payment of the paper receipt.

It is noted that when the paper bill or the paper receipt is printed out, the printer 15 of the consultation service apparatus 10 can further print a barcode for later inquiry on the paper bill or the paper receipt to facilitate speedy inquiry of the payment condition or progress of the application.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An information processing method for an automatic civic service system, wherein a consultation service apparatus is installed at a public space and is connected to a remote end through a network, the information processing method comprising steps of:
    scanning an application document and identity credentials to generate application image information containing content of the application document and the identity credentials for an application;
    determining a type of service to be performed according to validity of the application image information;
    when determining that the application image information is validated correctly, performing service classification and transmitting the application image information to a corresponding business or institutional organization of the remote end; and
    generating a certificate of completion to prove that all procedures for the application are done.

2. The information processing method as claimed in claim 1, wherein the step of generating a certificate of completion includes steps of generating a payment procedure and after the payment procedure is done, printing out a paper receipt.

3. The information processing method as claimed in claim 1, wherein after the application image information is generated, user's information on the application document is compared with corresponding information on the application image information to confirm user's identity, and when the user's identity is verified to be correct, performing the step of determining a type of service to be performed.

4. The information processing method as claimed in claim 1, wherein the step of scanning an application document and identity credentials includes steps of:
    extracting a piece of identity information from the image pertinent to the identity credentials; and
    pasting the extracted identity information on an image of the application document in the application image information.

5. The information processing method as claimed in claim 1, wherein the step of determining a type of service to be performed includes steps of:
    performing a recognition analysis procedure on the application image information to generate an analysis result;
    determining if classification marking of the corresponding business/institutional organization is performed according to the analysis result;
    attaching a classification mark to the application image information when determining that the classification marking is performed; and
    transmitting the application image information to the corresponding business/institutional organization of the remote end according to the classification mark.

6. The information processing method as claimed in claim 2, wherein the step of generating a certificate of completion includes steps of generating a payment procedure and after the payment procedure is done, printing out a paper receipt includes steps of:
    providing a cash payment mechanism, a credit card payment mechanism, or a barcode payment mechanism;
    printing out a paper bill with corresponding payment information thereon after completing the cash payment mechanism; and
    printing out a paper receipt with a timestamp and information for proof of payment after completing the credit card payment mechanism or the barcode payment mechanism.

7. The information processing method as claimed in claim 5, wherein the recognition analysis procedure includes a barcode recognition algorithm, an OCR (Optical Character Recognition) algorithm, and a form characteristic recognition algorithm.

8. The information processing method as claimed in claim 2, wherein the paper receipt includes a barcode for subsequent inquiry of a payment condition or progress of the application.

9. The information processing method as claimed in claim 6, wherein the paper bill or the paper receipt includes a barcode for subsequent inquiry of a payment condition or progress of the application.

10. A consultation service apparatus of an automatic civil service system, comprising:
    a display module providing a display screen;
    an input module adapted for a user to input;
    a communication module connected to at least one business or institutional organization of a remote end through a communication protocol;
    an image scanner scanning an application document of an application and identity credentials placed therein by the user to generate application image information containing content of the application document and the identity credentials;
    a printer printing with multiple types of papers varying in paper size and paper texture; and
    a processor electrically connected to the display module, the input module, the communication module, the image scanner, and the printer;
    wherein the processor receives the application image information from the image scanner, performs a recognition analysis procedure to generate an analysis result, performs service classification according to the analysis result and transmits the application image information to a corresponding business or institutional organization through the communication module, and generates a certificate of completion taken as proof for completion of all procedures of the application through the display module and the printer.

11. The consultation service apparatus as claimed in claim 10, wherein the display module and the input module are combined to form a touch display, and the certificate of completion is displayed by the touch display.

12. The consultation service apparatus as claimed in claim 10, wherein the display module and the input module are combined to form a touch display, and the certificate of completion is printed out by the printer in the form of a piece of paper.

13. The consultation service apparatus as claimed in claim 10, wherein the printer prints out a paper receipt after a payment procedure is performed.

14. The consultation service apparatus as claimed in claim 10, wherein the display module and the input module are combined to form a touch display, the image scanner is an ADF (Automatic Document Feeder) image scanner, and the printer is a monochrome printer or a color printer.

15. The consultation service apparatus as claimed in claim 10, further comprising:
  a base; and
  a body mounted on a top surface of the base, receiving the communication module, the image scanner, the printer, and the processor therein, and having two slots formed through a wall of the body to respectively correspond to a paper entry of the image scanner and a paper exit of the printer, wherein the touch display formed by the display module and the input module is mounted on a top of the body.

16. An automatic civic service system comprising:
  a cloud server located at a remote end and associated with at least one business or institutional organization; and
  a consultation service apparatus installed in a public space, connected to the cloud server through a network to exchange information, and having a touch display, an image scanner and a printer;
  wherein the touch display provides an operation interface, the image scanner scans an application document of an application and identity credentials to generate application image information containing content of the application document and the identity credentials, the consultation service apparatus transmits the application image information to the cloud server for the cloud server to perform service classification according to validity of the application image information, when the application image information is determined to be valid, the cloud server performs the service classification and transmits the application image information to a corresponding business or institutional organization, and when the corresponding business or institutional organization receives the application image information, the cloud server transmits a certificate of completion to the consultation service apparatus for proof of completion of all procedures of the application.

17. The automatic civic service system as claimed in claim 16, wherein the certificate of completion is displayed by the touch display.

18. The automatic civic service system as claimed in claim 16, wherein the certificate of completion is printed out by the printer in the form of a piece of paper.

19. The automatic civic service system as claimed in claim 16, wherein the printer prints out a paper receipt after a payment procedure is performed.

* * * * *